Oct. 5, 1954     W. M. JEFFERS     2,691,126
BRAKING SYSTEM FOR ELECTRICAL MOTORS
Filed May 25, 1953
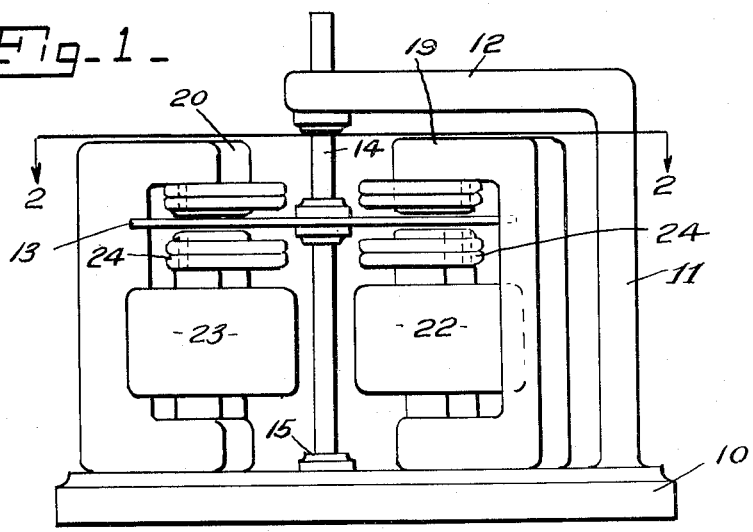
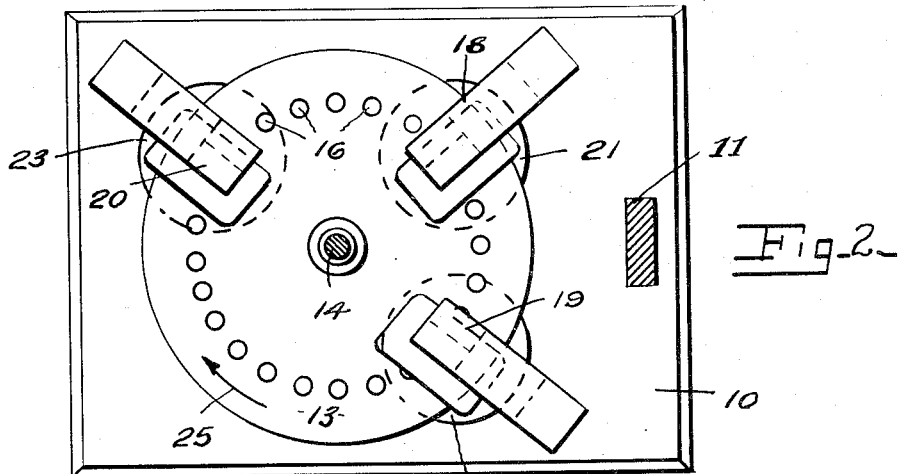
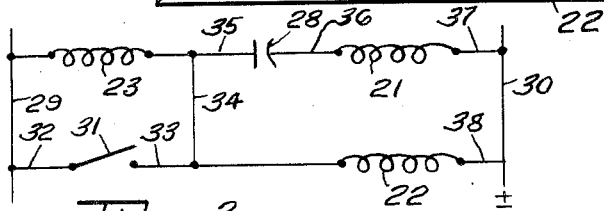
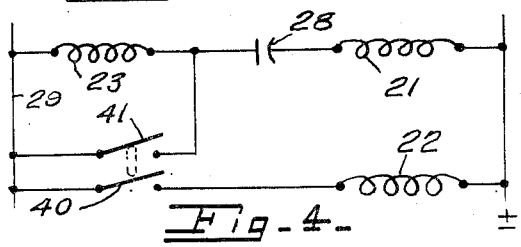
INVENTOR.
WALTER M. JEFFERS
BY
*D. Emmett Thompson*
ATTORNEY.

Patented Oct. 5, 1954

2,691,126

UNITED STATES PATENT OFFICE 2,691,126

BRAKING SYSTEM FOR ELECTRICAL MOTORS

Walter M. Jeffers, Syracuse, N. Y., assignor to Crouse-Hinds Company, Syracuse, N. Y., a corporation of New York Application May 25, 1953, Serial No. 356,939

3 Claims. (Cl. 318—382)

This invention relates to electric motors, and more particularly to such motors of the single phase type having a pair of running windings or coils with a capacitor connected in series with one of the coils. In certain situations wherein these motors are used, it is often desirable to stop the motor quickly so that the apparatus operated by the motor may be stopped at a predetermined position. Ordinarily, when the power supply is disconnected from the motor, it has a tendency to coast or continue to rotate for a considerable length of time. The extent of this coasting and the coasting of the apparatus to which the motor is connected is not uniform and therefore there is no assurance, upon disconnecting the motor from the power supply, that the apparatus controlled by the motor will stop in any predetermined position. For example, when these motors are used to operate traffic signal controllers, it is often desirable to stop the controller in a certain predetermined position of its cycle and to subsequently start the motor instantaneously, or to start another motor connected to a different portion of the controller and have it start instantaneously upon the stopping of the first motor.

These motors have been previously equipped with mechanical and electrical brake means. The mechanical brake is not entirely reliable and places great shock and strain upon the motor. The electrical brake devices heretofore used have not functioned to quickly stop the motor, and are not releasable in such manner that the motor can be quickly started.

This invention has as an object a motor of the type referred to embodying a dynamic braking arrangement which functions to instantaneously stop rotation of the rotor of the motor and to provide full torque available for quickly starting the motor.

The invention consists in the novel features and in the combinations and constructions hereinafter set forth and claimed.

In describing this invention, reference is had to the accompanying drawings in which like characters designate corresponding parts in all the views.

In the drawings:

Figure 1 is a side elevational view of a motor embodying my invention.

Figure 2 is a view taken on line 2—2 of Figure 1.

Figure 3 is a schematic across the line wiring diagram of the electrical circuit.

Figure 4 is a schematic across the line wiring diagram of a modified circuit.

The motor herein disclosed to illustrate my invention is of the disk type disclosed in my prior Patent No. 2,378,556, issued June 19, 1945.

The motor consists of a suitable base 10 provided with a bracket 11 having a portion 12 extending horizontal to the base. The rotor 13 is mounted on a shaft 14 journalled at one end in a bearing 15 in the base and at its opposite end in the portion 12 of the bracket. The rotor 13 consists of a disk mounted on the shaft intermediate its ends and arranged to rotate between pairs of pole pieces. The disk is provided with a circular series of pellets 16 of magnetic material to give it synchronous characteristics.

There are two pairs of driving pole pieces 18, 19, and a pair of braking pole pieces 20. The pole pieces 18 are provided with a driving coil 21, and the pole pieces 19 with a coil 22. The braking pole pieces 20 are provided with a braking coil 23. All of the pole pieces are provided with conventional shading rings 24. These rings on the pole pieces 18, 19, are poitioned to effect rotation of the disk in a clockwise direction, Figure 2, as indicated by the arrow 25. The shading ring 24 on the braking pole pieces 20 is arranged to effect a counterclockwise rotation of the disk.

A capacitor 28 is connected in series with the driving coil 21, and the series combination of coil 21 and capacitor 28 are connected to the power supply through a switch means 31. In the arrangement shown in Figure 3, the switch means 31 consists of a single pole, single throw switch, one side of which is connected to supply wire 29 through a wire 32. The other side of the switch is connected to the capacitor 28 through wires 33, 34, 35, the capacitor being connected to the driving coil 21 through wire 36 and the coil connected to the opposite side 30 of the power supply through wire 37.

The second running coil 22 is also connected to the wire 33 and to the side 30 of the line through the wire 38. The braking coil 23 is connected in shunt with the switch 31. When the switch 31 is closed, power is supplied to the driving coil 22 and to the series combination of the capacitor 28 and the driving coil 21, effecting normal operation of the motor. With switch 31 closed, no current flows through the braking coil 23 because it is shunted by the closed switch.

When the switch 31 is opened, the direct connection between driving coil 22 and the side 29 of the power supply is interrupted and current passes through the series combination of the braking coil 23, capacitor 28, driving coil 21. When this situation prevails, the coil 23 produces flux in the braking pole piece 20 and by means of the arrangement of the shading coil 24 thereon produces torque in opposition to that of the driving pole pieces 18.

Coil 23 is so proportioned as to have the maximum ampere turns when the coil is connected in circuit by the opening of the switch 31, thus effecting a high flux density in the pole piece 20, causing the disk 13 to stop rotating substantially instantaneously.

When switch 31 is closed, current immediately ceases to flow in the coil 23 thereby removing the braking effect of the pole pieces 20 and at the same instant power is applied to both of the running coils 21, 22, to effect high torque for instant starting of the rotor disk 13.

While the circuit arrangement described in connection with the diagram shown in Figure 3 functions to effect quick stopping and starting of the motor, it is necessary that special attention be given some of the component parts of the motor. For example, it is necessary to employ a greater number of turns in the coil 23 than in the coils 21, 22, thereby making coil 23 an especially wound coil—this because the currents through the coils 21, 22, are not in phase because of the condenser 28. Therefore the current through coil 23, when the switch 31 is open, is less than the sums of currents through the coils 21, 22. Also, the series combination of the condenser 28, coil 21, is designed so as to be partially resonant when switch 31 is closed. When the switch 31 is open, the coils 21, 22, are connected in parallel and this parallel combination is in series with the coil 23. Under this condition, coil 22 shuts the series combination of coil 21 and condenser 28, thus throwing the series combination off resonance sufficiently to considerably reduce the current through the coils 21, 23, with the result of a low density of flux in both of the pairs of pole pieces 18, 20, thereby making the braking effect somewhat sluggish. Also, in connection with the circuit arrangement shown in the diagram of Figure 1 in respect to the disk type of motor employing the shading rings, it is necessary to initially more accurately adjust the shading rings 24 on all three pairs of pole pieces in order to obtain proper operation of such a motor.

I have found that these problems can be eliminated by the circuit arrangment shown in the diagram, Figure 4. In this arrangement, the switch means is of the double pole, single throw type having a contact 40 for connecting and disconnecting the driving coil 22 to the power supply. The second contact or pole 41 of the switch functions to connect the driving coil 21 to the power supply in series with the capacitor 28 and is arranged in shunt with the braking coil 23 in the same manner as shown in the arrangement of Figure 3.

With the driving coils 21, 22 thus separately connected to the power supply, no current flows through the driving coil 22 when the switch is actuated to open position and the coil 22 is not in shunt with the coil 21 and capacitor 28, whereby the circuit, including the braking coil 23, capacitor 28, driving coil 21, remains resonant. This results in full line potential across both of the coils 21, 23, effecting a high density of flux in the pole pieces 18, 20, thereby developing a high braking torque. This permits the coils 21, 22, 23, to be all wound in the same manner, thus avoiding the necessity of winding a special coil for the motor and because of the exceedingly high braking torque developed, it is not necessary to effect accurate adjustment of the shading coils 24. It will of course be understood that the capacitor 28 is selected to give substantially full resonance to the series combination of coils 21, 23 and the capacitor.

What I claim is:

1. An electric motor having two driving coils and a braking coil, a capacitor connected in series with one running coil, said braking coil being connected in series with the capacitor and running coil series combination, a normally closed switch connecting said driving coils to the power supply, and said braking coil being connected in shunt with said switch.

2. An electric motor having a pair of running coils, a capacitor connected in series with one of said running coils, said other running coil being connected in parallel with said series combination, a braking coil connected to the power supply in series with said series combination, a single pole, single throw switch for energizing said parallel combination and being connected in shunt with said braking coil.

3. An electric motor having a pair of driving coils, a capacitor connected in series with one driving coil, switch means separately connecting said series combination and said other driving coil to the power supply, and a braking coil connected in shunt with said switch means.

No references cited.